United States Patent
Ohkubo

(10) Patent No.: US 6,649,241 B2
(45) Date of Patent: Nov. 18, 2003

(54) PHASE-CHANGE OPTICAL DISK

(75) Inventor: Shuichi Ohkubo, Tokyo (JP)

(73) Assignee: NEC Corporation (JP)

( * ) Notice: Subject to any disclaimer, the term of this patent is extended or adjusted under 35 U.S.C. 154(b) by 29 days.

(21) Appl. No.: 10/119,355

(22) Filed: Apr. 9, 2002

(65) Prior Publication Data

US 2002/0192424 A1 Dec. 19, 2002

(30) Foreign Application Priority Data

Apr. 18, 2001 (JP) ........................................ 2001-119239

(51) Int. Cl.$^7$ ................................................. B32B 3/02
(52) U.S. Cl. ................... 428/64.1; 428/64.4; 428/64.5; 428/64.6; 430/270.13
(58) Field of Search ............................. 428/64.1, 64.4, 428/64.5, 64.6, 913; 430/240.13, 495.1, 945; 369/283, 288

(56) References Cited

U.S. PATENT DOCUMENTS

| | | | |
|---|---|---|---|
| 6,312,780 B1 * | 11/2001 | Kasami | 428/64.1 |
| 6,406,771 B1 * | 6/2002 | Nakakuki | 428/64.1 |
| 6,410,115 B1 * | 6/2002 | Tsai | 428/64.1 |
| 6,514,591 B1 * | 2/2003 | Nagata | 428/64.1 |
| 2003/0099185 A1 * | 5/2003 | Nakamura | 369/275.2 |

FOREIGN PATENT DOCUMENTS

JP  2000-105946 A  4/2000

* cited by examiner

*Primary Examiner*—Elizabeth Mulvaney
(74) *Attorney, Agent, or Firm*—Hayes Soloway P.C.

(57) ABSTRACT

A phase-change optical disk includes a first dielectric layer, reflecting layer, first interface layer, recording layer, second interface layer, second dielectric layer, and light-transmitting layer sequentially formed on a support substrate. Information is written on, read from, and erased from the phase-change optical disk by changing a crystalline state of the recording layer with a laser beam radiated from a light-transmitting layer side. A disk reflectance Rc obtained when the recording layer is in a crystalline state is not less than 3% and not more than 12%. A difference in absolute value between the disk reflectance Rc and a disk reflectance Ra which is obtained when the recording layer is in an amorphous state is not less than 10%. A refractive index of one of the first and second interface layers for the laser beam with a wavelength $\lambda$ is higher than 2. The reflecting layer contains, as a main component, either one of one element selected from the group consisting of silver, copper, titanium, and nickel and a mixture of at least two elements selected from the group consisting of silver, cupper, titanium, and nickel.

15 Claims, 2 Drawing Sheets

PHASE-CHANGE OPTICAL DISK

BACKGROUND OF THE INVENTION

The present invention relates to an optical information recording medium on and from which information is written and read by laser beam irradiation and, more particularly, to a phase-change optical disk on which information is written by changing the phase state of a recording layer and from which information is read by utilizing a change in optical characteristics between an amorphous state and crystalline state of the recording layer.

As an optical information recording medium that utilizes the recent optical technique, a magneto-optical disk or phase-change optical disk is provided. Of these disks, information is written on the phase-change optical disk by changing the recording layer between the crystalline state and amorphous state, and information is read from the phase-change optical disk by utilizing a difference in optical reflectance or optical transmittance between the crystalline state and amorphous state of the recording layer. In a conventional phase-change optical disk, generally, an absorptivity Aa in the amorphous state is higher than an absorptivity Ac in the crystalline state.

To increase the recording density, the pitches of the recording tracks of the phase-change optical disk may be narrowed. When, however, a certain recording track is irradiated with a laser beam to change the phase (crystalline state) of the recording layer, thus performing recording, temperature rise and crystallization, or so-called cross erasure, occurs due to light absorption in an amorphous recording mark with a high absorptivity, which is present on an adjacent recording track. To prevent this cross erasure, it is effective to decrease the absorptivity Aa in the amorphous state to be lower than the absorptivity Ac in the crystalline state, as described in Japanese Patent Laid-Open No. 2000-105946.

In the optical information recording described above, a technique that increases the numerical aperture (NA) of an objective lens (optical system) to be used in an optical head to as high as 0.85 has been proposed in recent years to improve the recording density. According to this technique, a recording layer is irradiated with a laser beam through a light-transmitting layer of an optical disk which is formed on the opposite side of the support substrate. The films of the respective layers comprising a reflecting layer, the recording layer, and the like are accordingly formed in an order opposite to the conventional order. However, since the reflecting layer made of a metal film or the like with a large particle size is formed immediately on the substrate, the reflecting surface has a low flatness, and the optical noise increases. Since the numerical aperture (NA) is increased to reduce the beam spot diameter, the time taken for the beam to pass through a certain small point of the recording layer decreases. Hence, the time during which the recording layer is held at a crystallization temperature or higher decreases, and an erasure ratio decreases.

As described above, the recording density cannot be easily improved by merely increasing the numerical aperture (NA) of the optical system of the optical head.

SUMMARY OF THE INVENTION

It is an object of the present invention to provide a phase-change optical disk in which the recording density is improved by increasing the NA of the optical system of an optical head.

In order to achieve the above object, according to the present invention, there is provided a phase-change optical disk which comprises a first dielectric layer, reflecting layer, first interface layer, recording layer, second interface layer, second dielectric layer, and light-transmitting layer sequentially formed on a support substrate, and writes thereon, reads therefrom, and erases therefrom information by changing a crystalline state of the recording layer with laser beam irradiation from a light-transmitting layer side, wherein a disk reflectance Rc obtained when the recording layer is in a crystalline state is not less than 3% and not more than 12%, a difference in absolute value between the disk reflectance Rc and a disk reflectance Ra which is obtained when the recording layer is in an amorphous state is not less than 10%, a refractive index of one of the first and second interface layers for the laser beam with a wavelength $\lambda$ is higher than 2, and the reflecting layer contains, as a main component, either one of one element selected from the group consisting of silver, cupper, titanium, and nickel and a mixture of at least two elements selected from the group consisting of silver, cupper, titanium, and nickel.

DESCRIPTION OF THE PREFERRED EMBODIMENT

The present invention will be described in detail with reference to the accompanying drawings.

Figure 1:
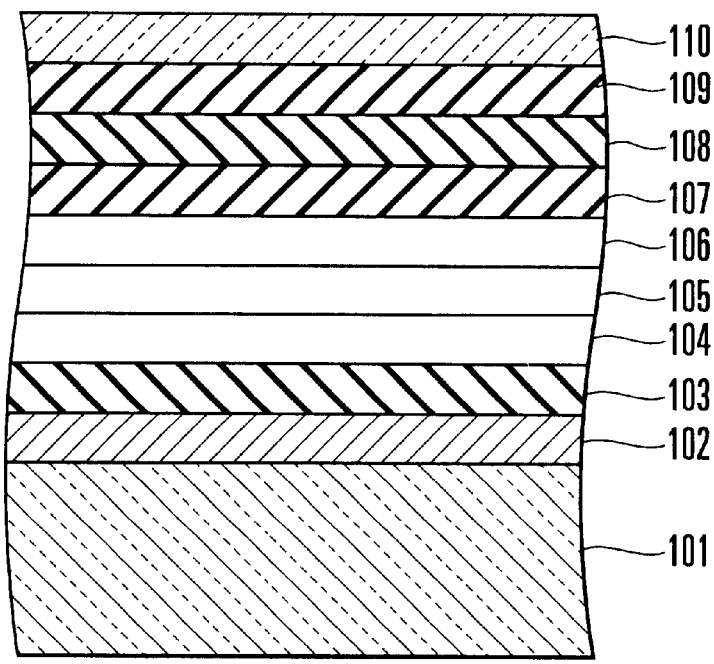
FIG. 1 is a sectional view showing the schematic arrangement of a phase-change optical disk according to an embodiment of the present invention.

FIG. 1 shows a phase-change optical disk according to an embodiment of the present invention. As shown in FIG. 1, the phase-change optical disk according to this embodiment is comprised of a reflecting layer 102, a first dielectric layer 103, a first interface layer 104, a recording layer 105, a second interface layer 106, second, third, and fourth dielectric layers 107, 108, and 109, and a light-transmitting layer 110 sequentially formed on a support substrate 101 made of polycarbonate or glass and having a thickness of about 0.6 mm to 2 mm.

Information is written on, read from, and erased from this phase-change optical disk by irradiating it with a laser beam through the light-transmitting layer 110. The support substrate 101 may alternatively be made of aluminum (Al) or an Al alloy.

As a reflecting layer used in a conventional phase-change optical disk for writing thereon, erasing therefrom, and reading therefrom information by irradiation of a laser beam to become incident from the support substrate side, a metal film containing Al as a main component is often used. To form a reflecting layer containing Al as a main component, sputtering is used for the sake of reduction of the process time. When, however, a film is to be formed at a high speed by sputtering, the size of particles that form the film increases, and the surface roughness tends to increase. When an Al film is formed as a reflecting layer and other films are successively formed, the surface roughnesses of other films increase due to the influence of the surface roughness of the Al film. Consequently, a surface roughness occurs on the reflecting surface, and a film roughness occurs on a film through which a signal light beam passes, increasing the noise of the signal light beam.

In order to decrease the noise caused by the reflecting layer, a film containing Ag, Cu, Ti or Ni, which can form a film with a small particle size and a small surface roughness, as a main component is preferably used as the reflecting layer 102. In either case, the percentage composition of the main component is preferably 70 at % or more. When Ag is the main component, Pd, Cu, Rt, Hf, Ti, or Ni can be used as an additive component. When the main component is Cu, Ti, or Ni, Si, Cr, or W can be used as an additive component. Alternatively, a mixture of two or more of Cu, Ti, and Ni can be used as a main component, and Ag can be used as an additive component.

Any reflecting layer 102 formed using the material described above increases noise if it is excessively thick. Hence, the film thickness is preferably 200 nm or less. If the film is excessively thin, the reflectance decreases, and the function as the reflecting layer cannot be sufficiently achieved, and the function as a heat sink cannot be sufficiently achieved either. Thus, a film thickness of 20 nm or more is necessary.

To decrease disk noise caused by the reflecting layer 102, it is effective to decrease the disk reflectance. The disk reflectance indicates the reflection state of a light beam becoming incident through the light-transmitting layer 110, and is not the reflectance of the reflecting layer 102 itself but that of the phase-change optical disk as a whole. The disk noise caused by the reflecting layer 102 is correlated to (generally proportional to the square of) the reflectance. The lower the disk reflectance, the more the disk noise can be suppressed.

Therefore, a disk reflectance Rc obtained when the recording layer 105 is in a crystalline state is preferably 12% or less. If the disk reflectance Rc is excessively low, a servo for signal reading becomes unstable. Also, a problem such as a decrease in reading precision of a prepit signal formed for address detection or the like occurs. Accordingly, the disk reflectance Rc is preferably 3% or more. In order to obtain a sufficiently large signal amplitude, the difference between the disk reflectance Rc (crystalline state) and a disk reflectance Ra (amorphous state) is preferably 10% or more.

In order to decrease cross erasure, Ac/Aa is preferably large, and is preferably at least 1.1 or more. To increase Ac/Aa, the disk reflectance Rc (crystalline state) may be lower than the disk reflectance Ra (amorphous state). For this purpose, a dielectric multilayer formed of the dielectric layers 107, 108, and 109 is formed between the light-transmitting layer 110 and recording layer 105. At this time, the refractive indices of the respective layers preferably satisfy n2>n3 and n4>n3 where n2, n3, and n4 are the refractive indices of the dielectric layers 107, 108, and 109, respectively.

The larger the difference between the refractive indices n2 and n3 and the difference between the refractive indices n3 and n4, the larger the number of combinations of the thicknesses of the respective layers that can increase Ac/Aa, leading to an increase in the degree of design freedom. For this reason, the difference between the refractive indices n2 and n3 and the difference between the refractive indices n3 and n4 are preferably 0.4 or more. In the above description, the three dielectric layers 107 to 109 are formed between the recording layer 105 and light-transmitting layer 110, but the present invention is not limited to this, and four or more dielectric layers may be formed between them. To decrease cross erasure, the thermal conductivity of the reflecting layer 102 is preferably high, and is preferably at least 20 W/mK or more.

The interface layers 104 and 106 serve to promote crystallization of the recording layer 105. More specifically, when the NA of the optical system of the optical head is high and the beam spot diameter is small, the interface layers 104 and 106 suppress a decrease in erasure ratio which occurs upon a decrease in time during which the recording layer 105 is held at a crystallization temperature or higher. In order to prevent a defect such as a pinhole or burst caused by peeling of the recording layer 105 or the like, a material with a low stress and good adhesion (adhesive force) with the recording layer 105 is suitable as the material of the interface layers 104 and 106. More specifically, GeXN (X is either one of Al, Cr, Ti, and Si, or a mixture of them; the percentage composition of X is 5 at % to 30 at %) is suitable.

As the adhesive force between a nitride and phase-change recording film (recording layer 105) is not so high, if the interface layers 104 and 106 are excessively thick, peeling tends to occur. In order to prevent this peeling, the thicknesses of the interface layers 104 and 106 are preferably 10 nm or less. If the interface layers 104 and 106 are excessively thin, defects of the films themselves increase. Hence, the interface layers 104 and 106 require thicknesses of 3 nm or more. When the laser beam is largely absorbed by the interface layers 104 and 106, light absorption by the recording layer 105 decreases, and a high laser power is required for writing. Hence, the fewer the light absorption by the interface layers 104 and 106, the better. For this purpose, extinction coefficients k of the interface layers 104 and 106 for a wavelength $\lambda$ are preferably 1 or less.

<Sample 1>

As sample 1, the following films were sequentially formed on a 1.2-mm thick polycarbonate support substrate 101 by sputtering. As a reflecting layer 102, a metal film made of 98 at % of Ag, 1 at % of Pd, and 1 at % of Cu is formed to a thickness of 150 nm. As a dielectric layer 103, an $SiO_2$ film was formed to a thickness of 30 nm. As each of interface layers 104 and 106, a film made of 90 at % of GeN and 10 at % of Al was formed to a thickness of 5 nm. As a recording layer 105, an AgGeSbTe film was formed to a thickness of 15 nm. As a dielectric layer 107, a film made of ZnS—$SiO_2$ was formed to a thickness of 30 nm. As a dielectric layer 108, an $SiO_2$ film was formed to a thickness of 30 nm. As a dielectric layer 109, a ZnS—$SiO_2$ film was formed to a thickness of 50 nm. After that, a 0.1-mm thick polycarbonate film was adhered on the dielectric layer 109 by using an ultraviolet-curing resin (adhesive) to form a light-transmitting layer 110. The pitch of the guide grooves (not shown) of the support substrate 101 was 0.6 $\mu$m.

With this phase-change optical disk, absorptivities Ac and Aa in crystalline and amorphous states, respectively, of the recording layer 105 were measured. The absorptivity Ac was 90%, and the absorptivity Aa was 60%. This phase-change optical disk was rotated at a linear velocity of 5 m/s, and measurement was performed by using an optical head constituted by an optical system with an NA of 0.85, which allowed irradiation of a 400-nm wavelength laser beam. The optical constants (n, k) of respective layers for the wavelength of 400 nm were (2.3, 0.3) in GeNAl, (2.35, 0.01) in ZnS—$SiO_2$, and (1.54, 0) in $SiO_2$.

The writing/reading characteristics were evaluated as follows. First, a 4-MHz signal with a duty of 50% was recorded on a land (a flat portion between guide grooves of the support substrate). After that, a 5-MHz signal with a duty of 50% was repeatedly recorded on two adjacent side grooves, and a change in carrier of the 4-MHz signal was measured. As is apparent from FIG. 2, even when information was rewritten repeatedly on the adjacent grooves, the 4-MHz signal was not adversely affected at all.

Figure 2:
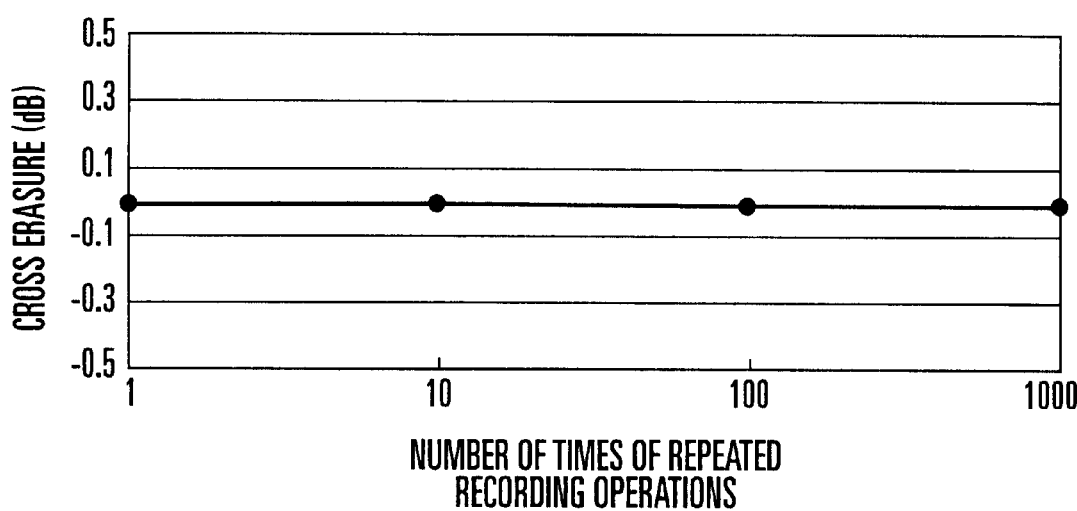
FIG. 2 is a graph showing the cross-erasure characteristics of the phase-change optical disk (sample 1) shown in FIG. 1.
Figure 3:
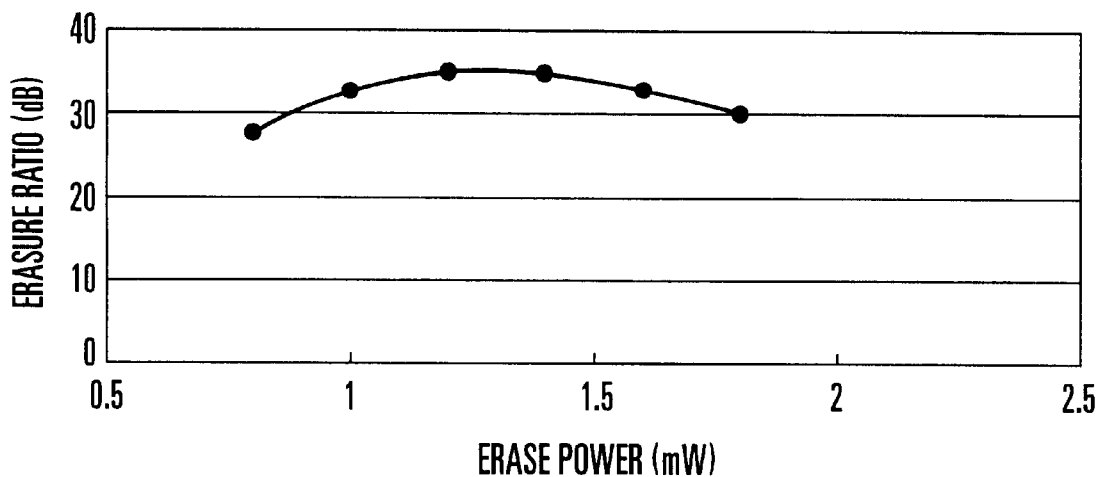
FIG. 3 is a graph showing the erasure characteristics of the phase-change optical disk (sample 1) shown in FIG. 1.

FIG. 2 shows a difference (Ci–Ca) between a carrier Ci of the 4-MHz signal measured with no information being written on the adjacent tracks and a carrier Ca of the 4-MHz signal measured after the 5-MHz signal was repeatedly recorded a predetermined number of times. The C/N of the 4-MHz signal was as high as 55B. When the erasure ratio was measured using this phase-change disk, a high erasure ratio of 30 dB or more was obtained, as shown in FIG. 3. The erasure ratio was measured as the attenuation ratio of the 4-MHz signal obtained when a 16-MHz signal was overwritten on the 4-MHz signal.

COMPARATIVE EXAMPLE 1

Figure 4:
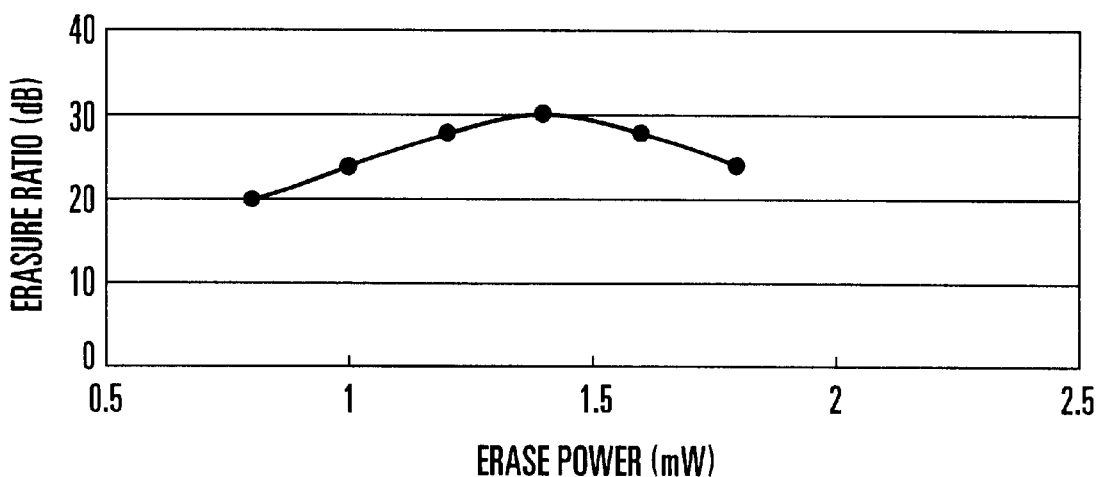
FIG. 4 is a graph showing the erasure characteristics of a conventional phase-change optical disk.

Using a support substrate 101, reflecting layer 102, recording layer 105, dielectric layers 103 and 107 to 109, and light-transmitting layer 110 identical to those of Sample 1, a disk with no interface layers 104 and 106 was fabricated, and its erasure ratio was measured under the same conditions as those described above. As shown in FIG. 4, only a low erasure ratio of about 15 dB was obtained. Obviously, the erasure ratio was greatly increased in Sample 1 by adding the interface layers 104 and 106.

COMPARATIVE EXAMPLE 2

Using a support substrate 101, recording layer 105, interface layers 104 and 106, dielectric layers 103 and 107 to 109, and light-transmitting layer 110 identical to those of Sample 1, a disk on which a metal film containing 90 at % of Al and 10 at % of Ti was formed as a reflecting layer 102 to a thickness of 150 nm was fabricated, and its C/N was measured with the same optical head under the same writing/reading conditions as those described above. The noise was high, and only a C/N of about 50 dB, which was lower than that of Sample 1 by 5 dB, was obtained.

<Sample 2>

A plurality of disks were formed, in which the layer arrangements were substantially the same as that of Sample 1 but the thicknesses of dielectric layers 107 to 109 were changed and disk reflectances Rc (crystalline state) were changed between 3% and 15%. These disks were subjected to error rate measurement by using the same optical head as that of Sample 1 under conditions of a linear velocity of 5 m/s and a recording line density of 0.116 $\mu$m/bit. From the result of this measurement, as shown in Table 1, a bit error rate of 1e–4 or less is obtained with a reflectance of 12% or less.

TABLE 1

Rc and Bit Error Rate

| Rc | Bit Error Rate |
| --- | --- |
| 3% | 3e – 6 |
| 8% | 1e – 5 |
| 12% | 9e – 5 |
| 13% | 2e – 4 |
| 15% | 5e – 4 |

<Sample 3>

Using a support substrate 101 identical to that of Sample 1, a 100-nm thick metal film containing 80 at % of Ni and 20 at % of Cr, a 20-nm thick $Al_2O_3$ film, a 2- to 12-nm thick film containing 80 at % of GeN and 20 at % of Cr, a 13-nm thick $Ge_2Sb_2Te_5$ film, a 2- to 12-nm thick film containing 80 at % of GeN and 20 at % of Cr, a 40-nm thick SiN film, a 20-nm thick $SiO_2$ film, and a 50-nm thick $ZnS—SiO_2$ film were respectively formed on it as a reflecting layer 102, dielectric layer 103, interface layer 104, recording layer 105, interface layer 106, dielectric layer 107, dielectric layer 108, and dielectric layer 109. A 0.1-mm thick polycarbonate film was adhered as a light-transmitting layer 110 on these layers with an ultraviolet-curing resin. The films were sequentially formed by sputtering except for the light-transmitting layer 110.

Concerning the phase-change optical disk formed in this manner, a relationship among the thickness of the interface layer 106, erasure ratio, and repeated overwrite characteristics was examined with the same optical head under the same writing/reading conditions as those of Sample 1. The number of times of repeated overwrite was defined as the number of times the C/N, measured by repeatedly recording a 4-MHz signal, decreased from the initial C/N by 3 dB. As shown in Table 2, the smaller the thickness, the higher the erasure ratio. The repeated overwrite characteristics are good for a thickness within a range of 3 nm to 10 nm. Accordingly, as the thickness of the interface layer, 3 nm to 10 nm is preferable. Considering the erasure ratio, the range of 3 nm to 4 nm is optimum.

TABLE 2

Thickness of Interface Layer and Overwrite Characteristics

| Thickness of Interface Layer | Erasure Ratio | Number of Times of Repetition |
| --- | --- | --- |
| 2 nm | 38 dB | 5e + 4 |
| 3 nm | 38 dB | 2e + 5 |
| 4 nm | 36 dB | 2e + 5 |
| 5 nm | 33 dB | 3e + 5 |
| 10 nm | 30 dB | 2e + 5 |
| 12 nm | 25 dB | 1e + 4 |

<Sample 4>

Using a substrate identical to that of Sample 1, a 150-nm thick metal film containing 95 at % of Cu and 5 at % of Si, a 15-nm thick $ZnS—SiO_2$ film, a 3-nm thick film containing 90 at % of GeN and 10 at % of Ti, a 18-nm thick AgGeSbTe film, a 3-nm thick film containing 90 at % of GeN and 10 at % of Ti, a 40-nm thick $ZnS—SiO_2$ film, a 35-nm thick $SiO_2$ film, and a 45-nm thick $ZnS—SiO_2$ film were sequentially formed on it by sputtering as a reflecting layer 102, dielectric layer 103, interface layer 104, recording layer 105, interface layer 106, dielectric layer 107, dielectric layer 108, and dielectric layer 109, respectively. A 0.1-mm thick polycarbonate film was adhered as a light-transmitting layer 110 on these layers with an ultraviolet-curing resin. The gas pressure employed when forming the interface layers 104 and 106 by sputtering was changed so the extinction coefficients of the interface layers 104 and 106 for a wavelength of 400 nm were changed within the range of 0.2 to 1.1, thereby fabricating a plurality of disks.

A relationship between the optimum write power and the extinction coefficients of the interface layers was examined with the same optical head under the same writing/reading conditions as those of Sample 1. The optimum write power was defined as a write power with which the secondary harmonic distortion (2nd H/C) of a 4-MHz signal became minimum. The upper limit of the maximum exit power of the laser beam used in this sample was 5 mW. As shown in the following Table 3, as the extinction coefficient increases, the optimum write power tends to increase. When the extinction coefficient was 1.1, 2nd H/C did not become the minimum value even with a 5-mW laser beam.

TABLE 3

Extinction Coefficient and Write Power

| Extinction Coefficient | Write Power |
|---|---|
| 0.20 | 4.2 mW |
| 0.50 | 4.5 mW |
| 1.00 | 4.9 mW |
| 1.10 | 5 mW or more |

<Sample 5>

Using a support substrate 101 identical to that of Sample 1, a 20-nm thick film containing 95 at % of Ti and 5 at % of Cr, a 30-nm thick $SiO_2$ film, a 3-nm thick film containing 85 at % of GeN and 15 at % of Cr, a 18-nm thick $Ge_2Sb_2Te_5$ film, a 3-nm thick film containing 85 at % of GeN and 15 at % of Cr, a 35-nm thick $ZnS$—$SiO_2$ film, a 30-nm thick $SiO_2$ film, and a 45-nm thick $ZnS$—$SiO_2$ film were sequentially formed on it by sputtering as a reflecting layer 102, dielectric layer 103, interface layer 104, recording layer 105, interface layer 106, dielectric layer 107, dielectric layer 108, and dielectric layer 109, respectively. A 0.1-mm thick polycarbonate film was adhered as a light-transmitting layer 110 on these layers with an ultraviolet-curing resin. In this sample, Ac/Aa was 1.1. The gas pressure employed when forming the reflecting layer 102 was changed so the thermal conductivity of the reflecting layer 102 was changed within a range of 10 W/mK to 25 W/mK.

A relationship between the thermal conductivity of the reflecting layer 102 and cross erasure was examined with the same optical head under the same writing/reading conditions as those of Sample 1. As shown in Table 4, it was confirmed that the lower the thermal conductivity, the larger cross erasure. Cross erasure does not occur when the thermal conductivity of the reflecting layer 102 is 20 W/mK or more.

TABLE 4

Thermal Conductivity and Cross Erasure

| Thermal Conductivity | Cross Erasure |
|---|---|
| 10 W/mK | −1.2 dB |
| 18 W/mK | −0.3 dB |
| 20 W/mK | 0 |
| 25 W/mK | 0 |

<Sample 6>

Using a support substrate 101 identical to that of Sample 1, a 20-nm thick film containing 95 at % of Ti and 5 at % of Cr, a 30-nm thick $SiO_2$ film, a 3-nm thick film containing 85 at % of GeN and 15 at % of Cr, a 18-nm thick $Ge_2Sb_2Te_5$ film, a 3-nm thick film containing 85 at % of GeN and 15 at % of Cr, a $ZnS$—$SiO_2$ film, an $SiO_2$ film, and a $ZnS$—$SiO_2$ film were sequentially formed on it by sputtering as a reflecting layer 102, dielectric layer 103, interface layer 104, recording layer 105, interface layer 106, dielectric layer 107, dielectric layer 108, and dielectric layer 109, respectively. A 0.1-mm thick polycarbonate film was adhered as a light-transmitting layer 110 on these layers with an ultraviolet-curing resin.

In this sample, Ac/Aa was changed within a range of 1.02 to 1.13 by changing the thicknesses of the dielectric layers 107, 108, and 109, and a relationship between Ac/Aa and cross erasure was studied with the same optical head and writing/reading conditions as those of Sample 1. As shown in the following Table 5, it was confirmed that the larger Ac/Aa, the smaller cross erasure. Cross erasure does not occur when Ac/Aa is 1.1 or more.

TABLE 5

Ac/Aa and Cross Erasure

| Ac/Aa | Cross Erasure |
|---|---|
| 1.02 | −1.0 dB |
| 1.08 | −0.2 dB |
| 1.10 | 0 |
| 1.13 | 0 |

As has been described above, according to the present invention, optical noise is suppressed, cross erasure is decreased, and a decrease in erasure ratio is suppressed. The recording density can thus be increased easily by increasing the NA of the objective lens of the optical head.

What is claimed is:

1. A phase-change optical disk which comprises a first dielectric layer, reflecting layer, first interface layer, recording layer, second interface layer, second dielectric layer, and light-transmitting layer sequentially formed on a support substrate, and writes thereon, reads therefrom, and erases therefrom information by changing a crystalline state of said recording layer with laser beam irradiation from a light-transmitting layer side, wherein a disk reflectance Rc obtained when said recording layer is in a crystalline state is not less than 3% and not more than 12%, a difference in absolute value between the disk reflectance Rc and a disk reflectance Ra which is obtained when said recording layer is in an amorphous state is not less than 10%, a refractive index of one of said first and second interface layers for the laser beam with a wavelength λ is higher than 2, and said reflecting layer contains, as a main component, either one of one element selected from the group consisting of silver, cupper, titanium, and nickel and a mixture of at least two elements selected from the group consisting of silver, cupper, titanium, and nickel.

2. A disk according to claim 1, wherein said reflecting layer has a thickness of not less than 20 nm and not more than 200 nm.

3. A disk according to claim 1, wherein said reflecting layer has a thermal conductivity of not less than 20 W/mK.

4. A disk according to claim 1, wherein a relationship Ac/Aa between absorptivities Ac and Aa is not less than 1.1.

5. A disk according to claim 1, wherein a refractive index n3 of said third dielectric layer is lower than a refractive index n2 of said second dielectric layer, and the refractive index n3 is lower than a refractive index n4 of said fourth dielectric layer.

6. A disk according to claim 1, further comprising third and fourth dielectric layers formed between said dielectric layer and said light-transmitting layer.

7. A disk according to claim 1, wherein extinction coefficients of said first and second interface layers for the laser beam with the wavelength λ are not more than 1.

8. A disk according to claim 1, wherein said first and second interface layers are made of either one of GeXN where X is one element of selected from the group consisting of Al, Cr, Ti, and Si and a mixture of at least two elements selected from the group consisting of Al, Cr, Ti, and Si.

9. A disk according to claim 1, wherein said first and second interface layers have thicknesses of not less than 3 nm and not more than 10 nm.

10. A phase-change optical disk which comprises a first dielectric layer, reflecting layer, first interface layer, recording layer, second interface layer, second dielectric layer, third dielectric layer, fourth dielectric layer, and light-transmitting layer sequentially formed on a support substrate, and writes thereon, reads therefrom, and erases therefrom information by changing a crystalline state of said recording layer with laser beam irradiation from a light-transmitting layer side, wherein a relationship Ac/Aa between an absorptivity Ac obtained when said recording layer is in a crystalline state and an absorptivity Aa obtained when said recording layer is in an amorphous state is not less than 1.1.

11. A disk according to claim 10, wherein a refractive index n3 of said third dielectric layer is lower than a refractive index n2 of said second dielectric layer, and the refractive index n3 is lower than a refractive index n4 of said fourth dielectric layer.

12. A disk according to claim 10, wherein said reflecting layer has a thermal conductivity of not less than 20 W/mK.

13. A disk according to claim 10, wherein extinction coefficients of said first and second interface layers for the laser beam with the wavelength $\lambda$ are not more than 1.

14. A disk according to claim 10, wherein said first and second interface layers are made of either one of GeXN where X is either one element selected from the group consisting of Al, Cr, Ti, and Si and a mixture of Al, Cr, Ti, and Si.

15. A disk according to claim 10, wherein said first and second interface layers have thicknesses of not less than 3 nm and not more than 10 nm.

* * * * *

UNITED STATES PATENT AND TRADEMARK OFFICE
CERTIFICATE OF CORRECTION

PATENT NO. : 6,649,241 B2
DATED : November 18, 2003
INVENTOR(S) : Ohkubo

It is certified that error appears in the above-identified patent and that said Letters Patent is hereby corrected as shown below:

<u>Title page,</u>
Item [57], ABSTRACT,
Line 19, "cupper" should be -- copper --.

<u>Column 2,</u>
Line 19, "cupper" should be -- copper --.
Line 21, "cupper" should be -- copper --.

<u>Column 8,</u>
Line 41, "cupper" should be -- copper --.
Line 43, "cupper" should be -- copper --.

Signed and Sealed this

Thirteenth Day of January, 2004

JON W. DUDAS
*Acting Director of the United States Patent and Trademark Office*